Aug. 3, 1965   J. R. MALLOY ETAL   3,198,103
PHOTOGRAPHIC PRINTERS
Original Filed July 28, 1958   7 Sheets-Sheet 1

INVENTOR.
JOHN R. MALLOY &
THEODORE HOMMEL
BY
*Alfred W. Petchaft*
ATTORNEY

Aug. 3, 1965   J. R. MALLOY ETAL   3,198,103
PHOTOGRAPHIC PRINTERS

Original Filed July 28, 1958   7 Sheets-Sheet 3

INVENTOR.
JOHN R. MALLOY &
THEODORE HOMMEL
BY
ATTORNEY

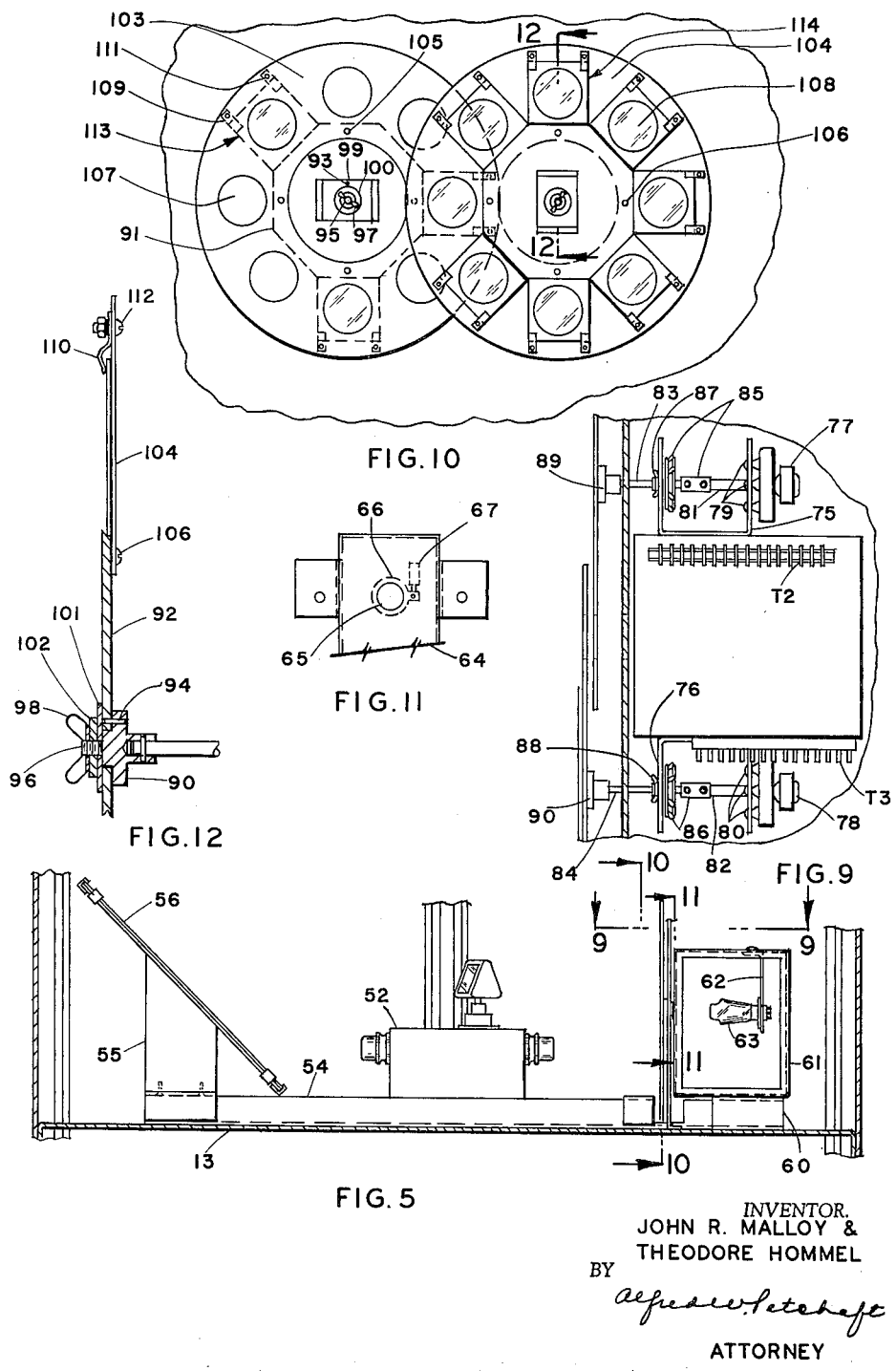

INVENTOR.
JOHN R. MALLOY &
THEODORE HOMMEL
BY
ATTORNEY

INVENTOR.
JOHN R. MALLOY &
THEODORE HOMMEL
BY
ATTORNEY

United States Patent Office 3,198,103
Patented Aug. 3, 1965

3,198,103
PHOTOGRAPHIC PRINTERS
John R. Malloy, Delaware County, and Theodore Hommel, Chester County, Pa., assignors to United States Banknote Corporation, a corporation of Virginia
Continuation of abandoned application Ser. No. 751,292, July 28, 1958. This application Dec. 14, 1960, Ser. No. 76,087
7 Claims. (Cl. 95—76)

This application constitutes a continuation of our co-pending application Serial No. 751,292, filed July 28, 1958, now abandoned.

This invention relates in general to photographic darkroom equipment and, more particularly, to a photographic contact printer.

In the graphic arts industry, a well-equipped darkroom employs numerous pieces of equipment for making contact prints, since ordinarily no one piece of equipment can make prints involving all types of photographic emulsions. Consequently, separate darkroom facilities are often employed for purposes of making color separations, maskings, duplicate black and white half tones, diazo color proofs and duplicates on an auto-positive film, multiple filter exposures, and the like, since these various photographic processes require different types of set-ups, filters, and light sources. Furthermore, in most of these processes, it is necessary to be able to expose the emulsion to a predetermined quantity of light which requires that both the quantity and color temperature of the light be integrated in terms of time.

It is, therefore, one of the objects of the present invention to provide a photographic printer which is capable of efficiently making virtually all types of contact prints independently of other darkroom facilities.

It is also an object of the present invention to provide a photographic printer of the type stated which conveniently houses all the light sources and filters ordinarily necessary for darkroom use.

It is an additional object of the present invention to provide a photographic printer of the type stated wherein the light output and color temperature of each light source may be accurately controlled in accordance with any particular printing process.

It is a further object of the present invention to provide a photographic printer of the type stated in which the filter selection is remotely controlled thereby, permitting rapid selection of the filters required in each process.

It is another object of the present invention to provide a photographic printer of the type stated which effectively prevents dust and dirt from entering the interior thereof.

With the above and other objects in view, our invention resides in the novel features of form, construction, arrangement, and combination of parts presently described and pointed out in the claims.

In the accompanying drawings (seven sheets):

Figure 8:
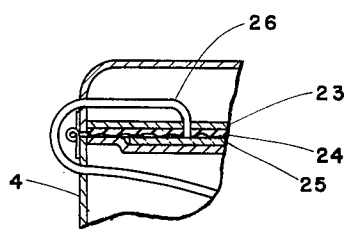
Figure 3:
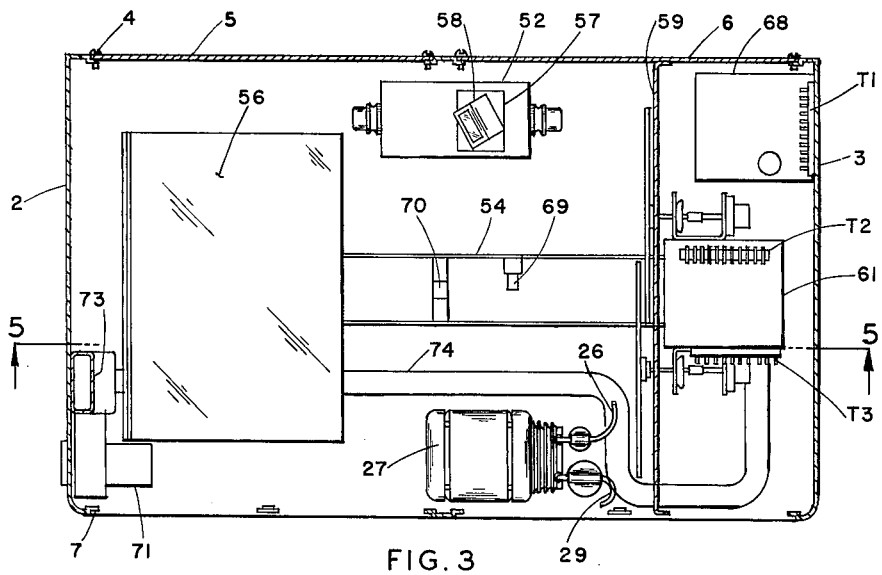
Figure 2:
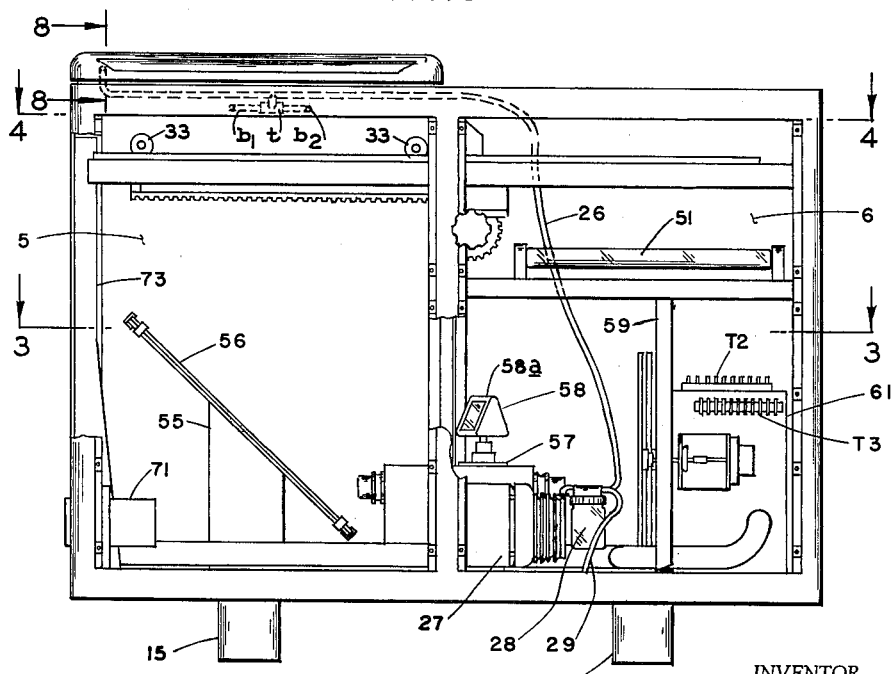
FIGURE 2 is a front elevational view of the photographic printer, partly broken away and with the front panels removed.
Figure 4:
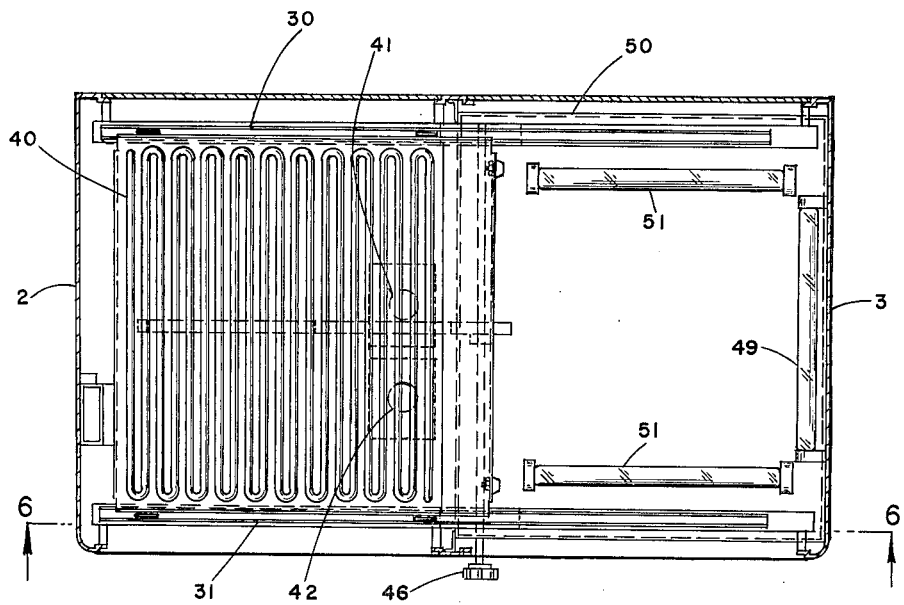
Figure 6:
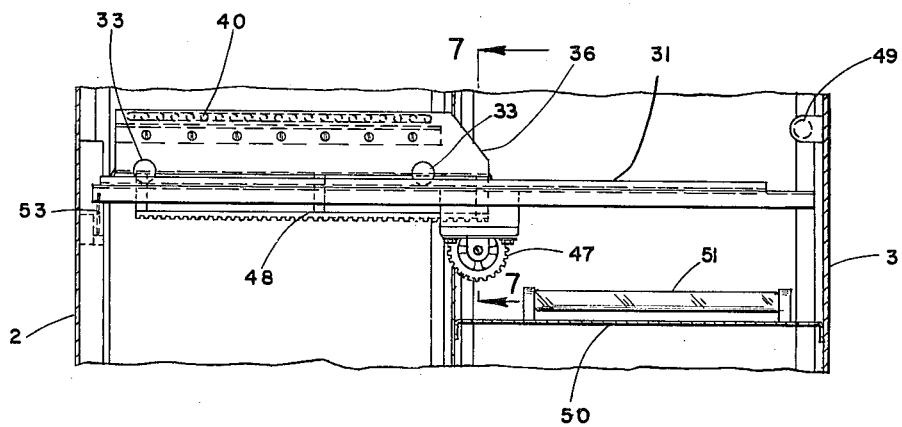
Figure 7:
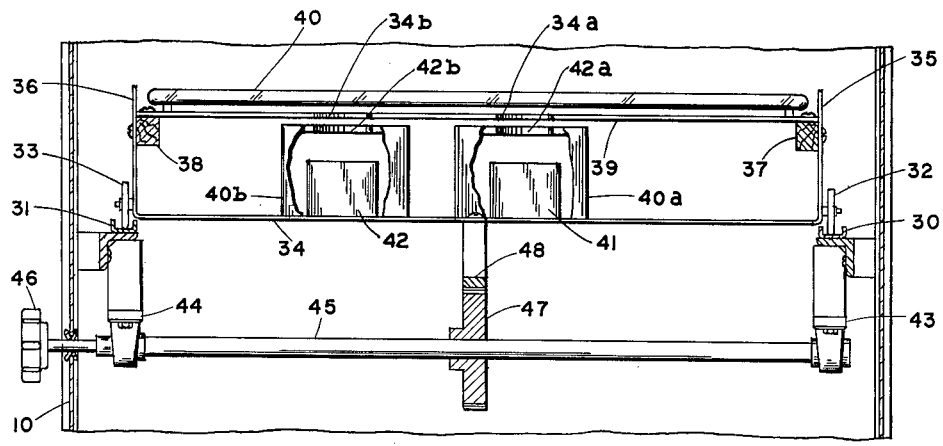
Figure 13:
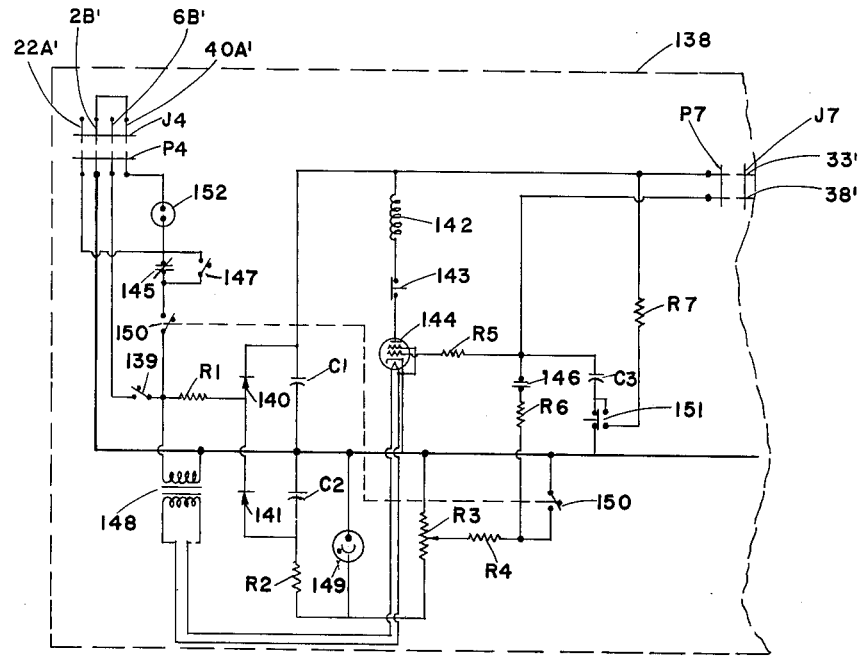
Figure 14A:
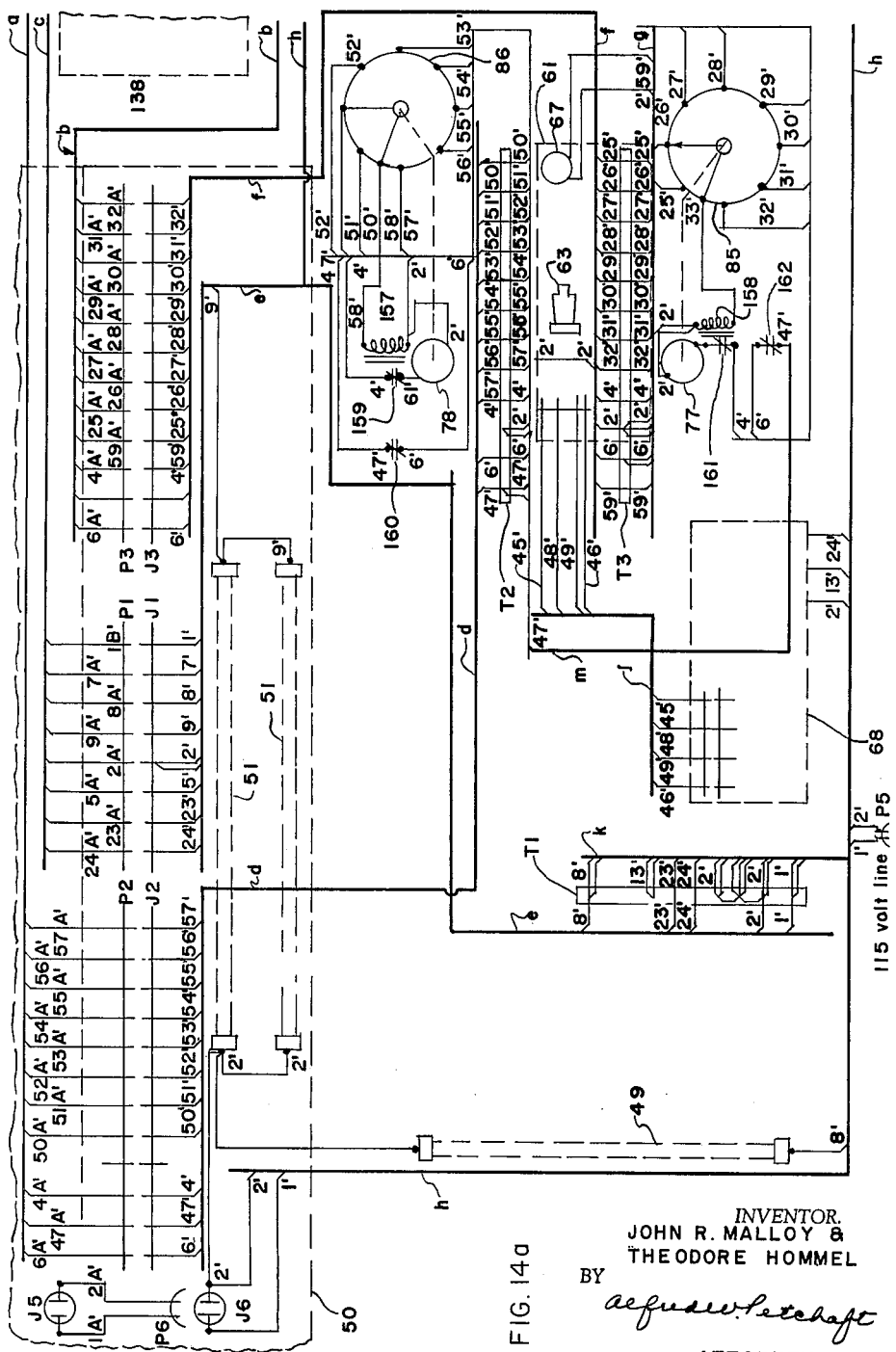
Figure 14B:
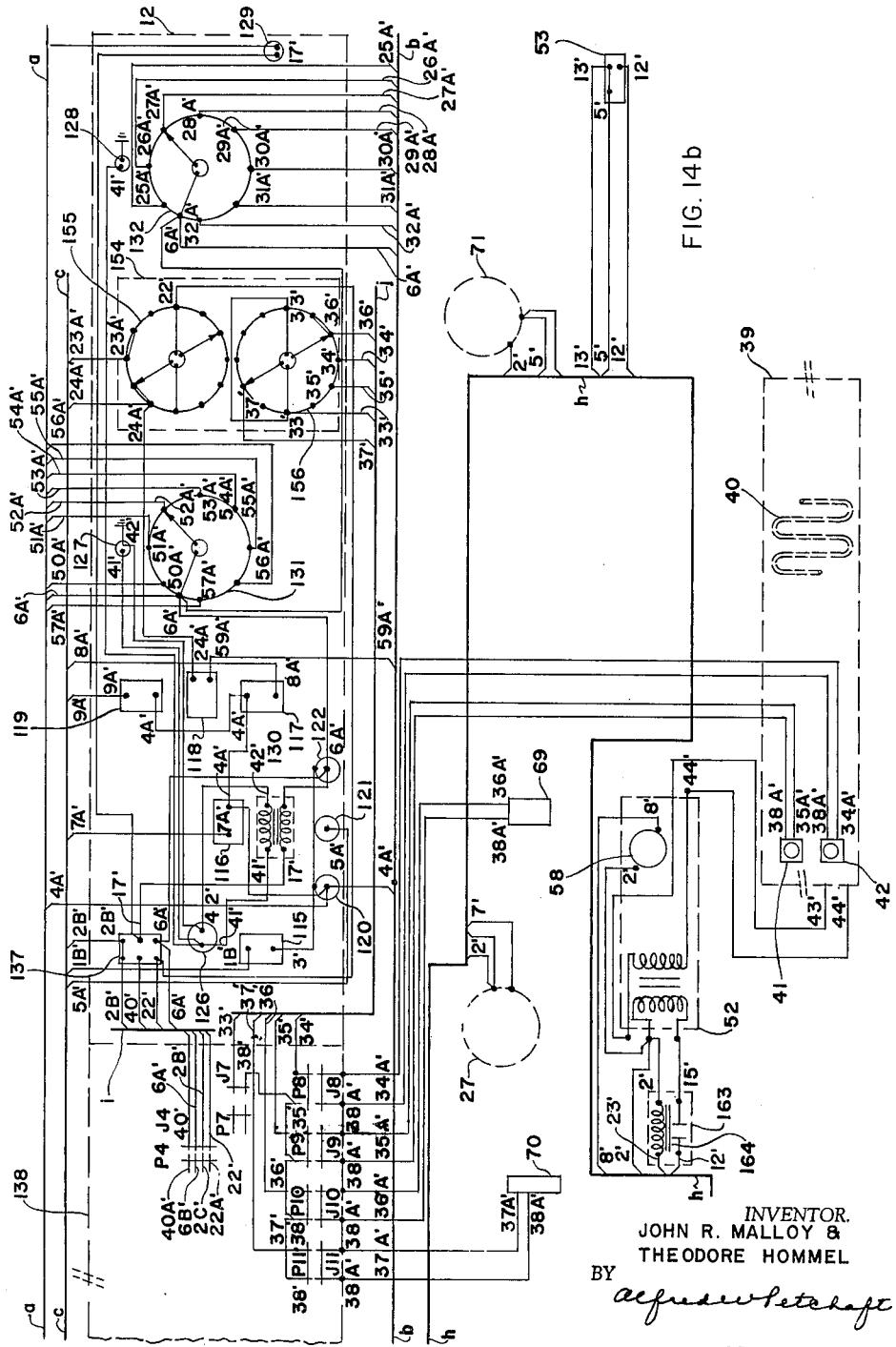

FIGURES 3 and 4 are sectional views taken along lines 3—3 and 4—4 of FIGURE 2;

FIGURE 5 is a fragmentary sectional view taken along line 5—5 of FIGURE 3;

FIGURE 6 is a fragmentary sectional view taken along line 6—6 of FIGURE 4;

FIGURE 7 is a fragmentary sectional view taken along line 7—7 of FIGURE 6;

FIGURE 8 is a fragmentary sectional view taken along line 8—8 of FIGURE 2;

FIGURES 9, 10 and 11 are fragmentary sectional views taken along lines 9—9, 10—10 and 11—11, respectively, of FIGURE 5;

FIGURE 12 is a fragmentary sectional view taken along line 12—12 of FIGURE 10;

FIGURE 13 is a schematic wiring diagram of the light integrator forming part of the present invention;

FIGURES 14a and 14b, taken together, show the wiring diagram of the photographic printer.

Referring now in more detail and by reference characters to the drawings, which illustrate a practical embodiment of the present invention, A designates a photographic printer comprising a generally rectilinear housing 1 including side walls 2, 3, a back wall 4 having a pair of panels 5, 6, the panel 6 being removable. The housing 1 also includes a front wall 7 having removable panels 8, 9, 10, 11 and a forwardly projecting control panel 12. Also provided on the housing 1 is a bottom wall 13, the lower side of which has a pair of spaced floor-contacting stands 14, 15. Secured to the front panel 10 by means of brackets 16, 17, is a forwardly projecting accessory shelf 18. Mounted in the housing 1 adjacent the side wall 3 is a horizontal light table 19, and adjacent the light table 19, but separated therefrom by a channel 20, is a transparent vacuum frame 21 provided with a heavy hollow lid 22 having a lower wall 23. Bonded or otherwise secured facewise to the undersurface of the wall 23, and substantially co-extensive therewith, is a ribbed rubberlike sheet 24, which, when the lid 22 is closed, is adapted to bear facewise against a transparent plate 25. The wall 23 and rubberlike sheet 24 are each bored for receiving a vacuum line 26, which extends rearwardly through the lid 22 and outwardly thereof and then inwardly through the rear wall 4 for connection with the intake side of a vacuum pump 27, the latter being mounted on the bottom wall 13. The discharge side of the vacuum pump 27 is provided with an air filter 28 and a discharge line 29 which projects downwardly toward the bottom wall 13. Preferably, the vacuum line 26 is connected through a suitable fitting $t$ and branch lines $b_1$, $b_2$ to a vacuum gauge G and manually operable relief valve $v$ which are mounted on the control panel 12. The valve $v$ permits adjustment of the pressure in the vacuum frame 21. In this connection, it should be noted that by regulating the vacuum in the vacuum frame 21, the tendency to form Newton rings on the film is minimized.

Mounted on the inwardly presented faces of the front and rear walls 7, 4 and in downwardly spaced relation to the light table 19 and vacuum frame 21, are opposed longitudinal channels 30, 31, and shiftably mounted in the channels 30, 31 are rollers 32, 33, which support a carriage 34 provided with a pair of spaced holes 34a, 34b. Mounted on the vertical side walls 35, 36, of the carriage 34 and in upwardly spaced relation from the rollers 32, 33, are spaced parallel wooden blocks 37, 38, and bolted or otherwise rigidly secured to the wooden blocks 37, 38, is a shelf 39. Mounted on the upwardly presented surface of the shelf 39 is a cold-grid light tube 40 which extends in continuous serpentine path and is substantially co-extensive with the shelf 39, as seen in FIGURES 4 and 7. Mounted on the carriage 34 are containers 40a, 40b for housing photo electric cells 41, 42 (each preferably RCA type 934), which are exposed to the cold-grid tube 40 through apertures 42a, 42b, so that when the cold-grid tube 40 is illuminated, light will impinge on the photo cells 41, 42. Preferably, one of the photo cells 41, 42, is screened so that its sensitivity is less than that of the other. Also mounted on the brackets 30, 31, are depending journals 43, 44, for rotatably supporting a cross shaft 45 which projects through the front panel 10 and is provided with manipulating knob 46, and rigidly mounted on the shaft 45, intermediate the bearings 43, 44, is a pinion 47, which meshes with a rack 48, the latter being bolted to, and depending from, the underside of the carriage 34. Thus, by rotating the knob 46, the carriage 34, together with the cold-grid light tube 40, can be shifted to operative position under the vacuum frame 21 or retracted into inoperative position under the light table 19.

Rigidly secured to the side wall 3 in downwardly spaced relation from the light table 19 is a red safe-light 49, and mounted within the housing 1 under the light table 19 and in downwardly spaced relation to the carriage 34 is a shelf 50 for supporting spaced viewing lights 51, 51. Thus, light from either the safe-light 49 or the viewing lights 51 will be transmitted upwardly through the light table 19. Bolted or otherwise rigidly secured to the bottom wall 13, adjacent the rear wall 4, is a high voltage power transformer 52 for the cold-grid light tube 40. The power transformer 52 is operatively connected to the tube 40 through a shelf interlock switch 53 so that high voltage can be delivered from the transformer 52 to the tube 40 only when the carriage is fully shifted to its operating position directly under the vacuum frame 21.

Bolted or otherwise rigidly secured to the bottom wall 13 intermediate the front wall 7 and back wall 4 is a longitudinally extending channel 54 provided on one end with an upwardly projecting supporting stand 55, the upper end of which supports an inclined mirror 56. Mounted on the power transformer 52 approximately midway between the side walls 2, 3 by means of a bracket 57 is an additional safe-light 58 which has an inclined face 58a and, when illuminated, the safe-light 58 will direct light upwardly through the vacuum frame 21.

Extending between the shelf 50 and bottom wall 13, intermediate the vacuum pump 27 and side wall 3, is a vertical partition 59, and mounted adjacent the partition 59 is a stand 60 for supporting a rectilinear lamp housing 61. Suspended within the housing 61 by means of a bracket 62 is a zirconium arc lamp 63 for providing a point light source. The forward wall 64 of the arc lamp housing 61 is provided with an aperture 65 which is in alignment with the point light source 63 and disposed across the aperture 65 is a shutter 66, the latter being adapted to be opened and closed by a solenoid 67. The arc lamp 63 is driven from a suitable power supply 68 which is preferably mounted adjacent the side wall 3 and back wall 4. Mounted on the channel 54, intermediate the partition 59 and mirror 56, are photo electric cells 69, 70, the photo cell 69 preferably being an RCA type 934, and the photo cell 70 preferably being an RCA type 926. These photo cells have different response curves both as to light intensity and color temperature. It will be apparent that light transmitted from the arc lamp 63 through the aperture 65 will be reflected by the mirror 56 upwardly through the vacuum frame 21, while, at the same time, the light will impinge upon the photo cells 69, 70.

Mounted within the housing 1 adjacent the side wall 2 and front wall is a blower 71, the intake side of which is connected to a filtered air intake 71a. Also connected to the blower 71 is a vertical return duct 73 which runs along the side wall 2. The discharge of the blower 71 is connected to a flexible hose 74, which is disposed along the bottom wall 13 for connection with the lamp housing 61, as best seen in FIGURES 2 and 3. When operating, the blower 71 will draw filtered air through the intake 71a and circulate air through the lamp housing 61, the interior of the housing 1, and the duct 73, thereby preventing the arc lamp 63 and other components within the housing 1 from over-heating.

Mounted on opposite sides of the arc lamp housing 61 are U-shaped brackets 75, 76, each having electric motors 77, 78, secured thereto by means of mounting screws 79, 80. Projecting forwardly from the motors 77, 78, are shafts 81, 82, which are, in turn, connected to wheel shafts 83, 84, by means of shaft couplings 85, 86. Also mounted on the shafts 83, 84, for rotation therewith are switch contactors 85', 86', which are adapted to cooperate with stationary contactors 87, 88, the latter being secured to the brackets 75, 76. The shafts 83, 84, project through the partition 59, and, at their forward ends, are pinned to wheel arbors 89, 90. Mounted on the arbors 89, 90, are octagonal wheel bases 91, 92, and the bases 91, 92, and arbors 89, 90, are each eccentrically drilled for receiving pins 93, 94. The arbors are, furthermore, provided with forwardly extending threaded portions 95, 96, for receiving wing nuts 97, 98, and interposed between the wing nuts 97, 98, and bases 91, 92, are washers, 99, 100, 101, 102. Mounted at the outer peripheries of the bases 91, 92, and concentric with the shafts 83, 84, are closely spaced, overlapping filter wheels 103, 104, the latter being secured to the bases by means of screws 105, 106,. The filter wheels 103, 104, are provided with a plurality of angularly disposed equally spaced holes 107, 108, and radially outwardly of the holes 107, 108, the wheels 103, 104, have a plurality of spring clips 109, 110, secured thereto by means of eyelets 111, 112. The spring clips 109, 110, are adapted to removably hold a plurality of filter holders 113, 114, the lower margins of which terminate adjacent the outer peripheries of the bases 91, 92. Preferably, the filter wheel 104 contains seven different color filters, leaving one of the holes 108 uncovered. The filter holders 113 on the filter wheel 103 usually contain a diffusing filter, a 10% light filter (undiffused), and a 10% diffused light filter. The remaining holes 107 may be left uncovered or, if desired, various types of special purpose filters may be placed thereon. It will be apparent that light from the point light source 63 will pass through the aperture 65 in accordance with the opening and closing of the shutter 66. This light will pass through whichever filters are in alignment with the aperture 65, and will, in turn, be projected onto the mirror 56 and reflected upwardly through the vacuum frame 21. The light will also impinge on the photo cells 69, 70 and thereby control the exposure and color temperature as will presently more fully appear.

Figure 1:
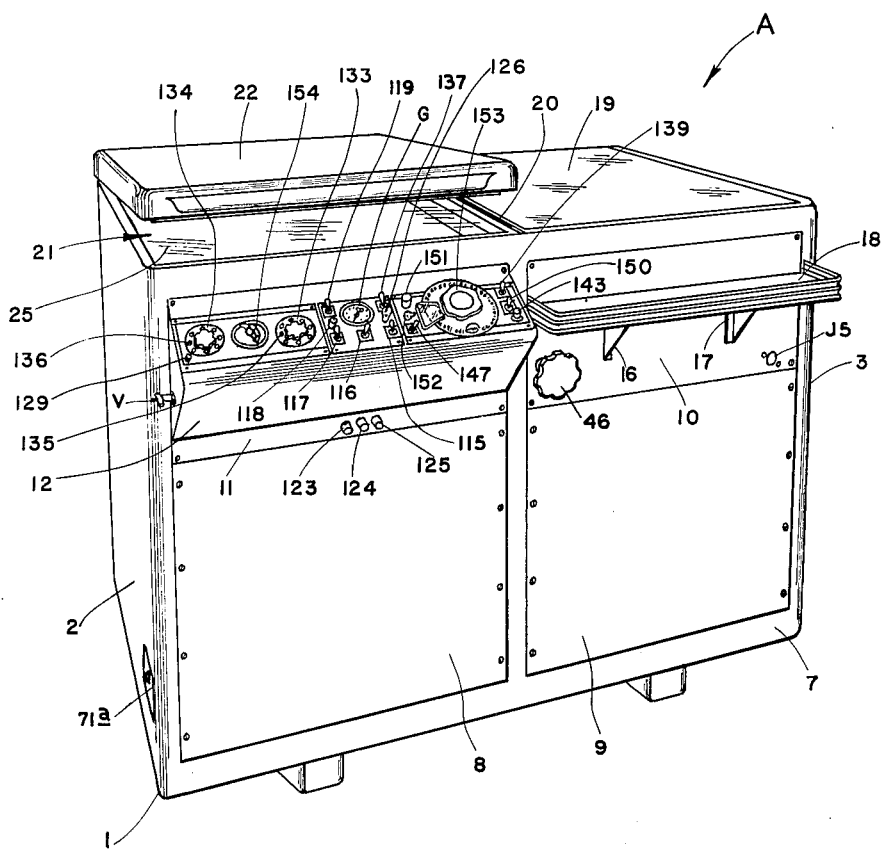
FIGURE 1 is a perspective view of a photographic printer constructed in accordance with and embodying the present invention.

Mounted on the control panel 12 is a main power switch 115, a vacuum pump switch 116, a safe-light switch 117, and exposure delay push-button switch 118, and a viewing light switch 119. The main power switch 115 is suitably connected to the power line and also to fuses 120, 121, 122, which are mounted in fuse holders 123, 124, 125, the latter being mounted on the removable panel 11. Also mounted on the control panel 12 is a power on-off pilot lamp 126 which also illuminates the vacuum gauge 6 and dial on the integrator 138, a pair of filter wheel pilot lamps 127, 128, and a drive motor pilot lamp 129. The lamps 126, 127, 128, 129, are preferably each supplied power from a suitable low voltage filament transformer 130. Also mounted on the control panel is a color filter wheel selector switch 131 and a density-diffusion selector switch 132. The selector switches 131, 132, are, in turn, connected to indicator disks 133, 134 (FIG. 1), for rotation therewith, and the disks 133, 134, are provided with annularly spaced holes 135, 136, each corresponding to one of the holes 107, 108. Preferably, the holes 135, 136, are fitted with suitable identifying indicia corresponding to the filters in the filter wheels 103, 104, and one of the holes 135, 136, is normally positioned over the lamps 127, 128, respectively. The lamps 126, 127, 128, 129 are for darkroom use and their operation is controlled by a panel light switch 137 mounted on the control panel 12.

Also mounted on, and housed behind, the control panel 12 is an electronic integrator 138 which controls and measures the light and color temperature from the cold cathode tube 40 and the arc lamp 63. The circuit of the integrator 138 is illustrated in FIGURE 13 and includes a power switch 139 which delivers power through a resistor R1, selenium rectifiers 140, 141, filter capacitors C1, C2, a relay coil 142, and starting switch 143, to the plate of a thyratron 144. The relay 142 is provided with a pair of normally closed contacts 145 and a pair of normally open contacts 146, and shunted across the contacts 145 is a manual control switch 147. Current to the cathode heater in the thyratron 144 is supplied through a suitable filament transformer 148. The integrator 138 is also provided with resistors R2, R3, R4, R5, and R6, a voltage regulator tube 149, an operating 150, a capacitor C3, a capacitor discharging switch 151, and a pilot lamp 152, all connected in the indicator circuit, as shown in FIGURE 13. The resistor R3 forms part of a potentiometer which is rotatable on the control panel 12 and includes a calibrated dial 153 for purposes of preselecting the amount of exposure desired. The integrator 138 and its operation is essentially the same as the integrator disclosed in U.S. Patent No. 2,815,454, and, therefore, the operation of the integrator 138 is not described in detail herein.

The integrator 138, the various switches, controls, and lamps on the control panel 12 are interconnected with the various components in the housing 1 by means of cables a, b, c, d, e, f, g, h, i, j, k, l, m, and the cables are connected through plugs P1, P2, P3, P4, P5, P6, P7, P8, P9, P10, P11, and corresponding jacks J1, J2, J3, J4, J5, J6, J7, J8, J9, J10, and terminal strips T1, T1, as indicated in FIGURES 13, 14a and 14b. The jack J5 is mounted on the panel 10 and serves as an electrical outlet for connection of auxiliary electrical devices. The conductors in the cable a are designated as 6A′, 47A′, 4A′, 50A′, 51A′, 52A′, 53A′, 54A′, 55A′, 56A′, and 57A′, while the conductors in the cable b are similarly designated as 6A′, 4A′, 59A′, 25A′, 26A′, 27A′, 28A′, 29A′, 30A′, 31A′, and 32A′. Similarly, the conductors in the cable c are designated as 24A′, 23A′, 5A′, 2A′, 9A′, 8A′, 7A′, and 1B′. The conductors in the cable d are similarly designated as 6′, 47′, 4′, 50′, 51′, 52′, 53′, 54′, 55′, 56′, 57′, and are interconnected with the conductors in the cable a through the plug P2 and jack J2. The wires 24′, 23′, 5′, 2′, 9′, 8′, 7′, and 1′, in the cable e are connected to the cable c through jack P1 and plug P1, and, similarly, the wires 6′, 4′, 59′, 25′, 26′, 27′, 28′, 29′, 30′, 31′ and 32′, in the cable f are connected to the wires in the cable b through the plug P3 and jack J3. Connections from the cables f and g are brought together at a terminal strip T3, while connections from the cables d and m are brought together across the terminal strip T2. Similarly, connections in the cable k are brought together in the cable e through terminal strip T1, all as shown in FIGURES 14a and 14b.

Connecting the arc lamp power supply 68 to the arc lamp 63 is a cable m including wires 46′, 49′, 48′, 45′. The cable i through the conductors 2B′, 40′, 22′, and 6A′, supply incoming and outgoing power for the integrator 138, as well as power to the pilot lamp 152. The wires 33′, 34′, 35′, 36′, 37′, in the cable j are connected to a four-position photo cell selector switch 154 which consists of a pair of wafers 155, 156, connected to the conductors 24A′, 23A′, 22′, 33′, 34′, 35′, 36′, and 37′. The conductors 33′, 34′, 35′, 36′, 37′, are in turn, connected through plugs P7, P8, P9, P10, through jacks J7, J8, J9, J10, and the photo cells 41, 42, 69, 70 are connected to jacks J8, J9, J10, J11, through conductors 34A′, 35A′, 36A′, 37A′, 38A′. The conductors 23A′, 24A′, 23′, 24′, are connected to the arc lamp power supply 68 and power transformer 52. The photo cell selector switch 154 is mounted on the control panel 12 intermediate the disks 133, 134, and permits selection of any one of the photo cells 41, 42, 69, 70, for use with the integrator 138, and, at the same time, operate as a power-selector switch for connecting the 115 volt power line to either power supply 68 or to the transformer 52. Consequently, when the cold-grid light source 40 is in operative position under the vacuum frame 21 and either of the photo cells 41, 42, is selected, power will be delivered to the transformer 52 upon operation of the integrator start switch 143 or manual operation switch 147. Similarly, when the cold-grid light source 40 is shifted to its inoperative position under the light table 19 and the switch 154 is rotated for selection of the photo cells 69, 70, line voltage can be supplied to the arc lamp power supply 68, allowing the arc lamp 63 to ignite upon closing of the start switch 143 or manual operation switch 147.

The driving motors 78, 79, are operable through relays 157, 158, having normally closed contacts 159, 160, 161, 162, the relay contacts 159, 160, 161 and 162, and relay coils 157, 158, being operatively connected as shown in FIGURES 14a and 14b. The drive motors 77, 78, operate uni-directionally and will position the appropriate filters 113, 114, in front of the aperture 65 in accordance with the position of the selector switches 131, 132. Thus, when it is desired to position a particular color filter 114 in front of the aperture 65, it is merely necessary to rotate the color filter selector switch 131 so that the hole 135 corresponding to the desired filter is disposed over the lamp 127. As this is done, the motor 78 will be energized causing the color filter wheel 104 to rotate until the proper filter thereon is in position in front of the aperture 65, whereupon the motor 78 will stop. During operation of the motor 78, the lamp 129 becomes illuminated and when the motor 78 stops, the lamp 129 will turn off, thereby signalling that the filter 114 is in position. The density-diffusion wheel 103 is actuated in a similar manner by rotation of the selector switch 132 so that the desired hole 136 on the disk 134 is above the lamp 128, whereupon the lamp 129 will become illuminated and the drive motor 77 will rotate the density-diffusion filter wheel 103 until the appropriate hole 107 or filter 113 is in front of the aperture 65.

In use, the main power switch 115, the panel light switch 137, are turned on together with the power switch 139 on the integrator 138. Closing of the main power switch 115 will also start the blower 71. If it is desired to utilize the cold-grid light source 40 as, for example, with slow emulsion direct positive films, the hand wheel 46 is rotated, shifting the carriage 34 and cold-grid light source 40 under the vacuum frame 21. When the carriage is in this position, the shelf interlock switch 53 will allow operation of the transformer 52. The photo cell selector switch 154 is then rotated so as to select either of the photo cells 41, 42, for use with the integrator 138, depending upon the length of exposure desired. The film and the emulsion paper are then placed within the vacuum frame 21, whereupon the lid 22 is closed and the vacuum pump switch 116 is closed to start the vacuum pump 27. The timer 153 on the integrator 138 is then set for the number of lumen-seconds of exposure desired. If the setting on the timer 153 is found to be incorrect, it is merely necessary to depress the cancelling switch 151 so as to discharge the capacitor C3. The timer 153 is then reset and the starting switch 143 is depressed, causing the normally open contacts 163 of the relay 164 to close, thereby delivering high voltage through the transformer 52 to the cold-grid tube 40. As long as the cold-grid tube 40 is illuminated, the lamp 152 will also be illuminated, and, at the end of the exposure interval as controlled by the photo cell, the integrator 138 will automatically shut off power to the relay coil at 64, causing the contacts 163 to open and shut off power to the cold-grid light tube 40. If it is desired to manually operate the cold-grid light tube 40, the manual operating switch 147 on the integrator 138 can be depressed, and the cold-grid light tube 40 operated for as long as desired.

The arc lamp 63 is utilized in much the same manner as the cold-grid light tube 40. Initially, however, the filter selector disks 133, 134, are rotated, so as to position the desired filters in front of the aperture 65. The photo cell selector switch 154 is then rotated for operation of the photo cell 69, or for operation of the photo cells 69, 70 with the integrator 138. If both photo cells 69, 70 are used they will be parallel connected and will function together to monitor the color temperature and meter the amount of light from the arc lamp 63. The knob 46 is rotated, shifting the carriage 34 and cold-grid light tube 40 so as to position the latter under the light table 19. The emulsion paper and negative are then placed in the vacuum frame as previously described, and the vacuum pump 27 turned on. The integrator timer dial 153 is then set for the proper number of lumen-seconds and the starting switch 143 depressed, thereby turning on the arc lamp 63 and, at the same time, energizing the solenoid 67 which, in turn, opens the shutter 66. When the emulsion in the vacuum frame 21 has been exposed to the preselected amount of light, the integrator 138 will de-energize the solenoid 67 to close the shutter 66 and also shut off the arc lamp 63. As in the case of the cold-grid light tube 40, the switch 147 on the integrator 138 can be used to manually operate the arc lamp 63 and shutter 66. In the case of very short exposures, it is sometimes desirable to delay opening the solenoid operated shutter 66, because, during the first few moments of the operation, the transient starting conditions of the arc lamp 63 will result in rather wide variations in light intensity and color temperature emitted therefrom. Consequently, the exposure delay switch 118 may be depressed so as to prevent energization of the solenoid 67 and opening of the shutter 66 during the transient starting interval of the arc lamp 63.

From the foregoing description, it will be apparent that the photographic printer A is extremely versatile in operation since it contains, in a unitary structure, virtually all of the equipment necessary for making contact prints on film or plate glass. Furthermore, by providing a cold-grid light source, a point light source, and a diffusing filter for the point light source, all the necessary light sources utilized in photographic emulsion are readily available to the photo-technician.

It should also be noted that, since the blower 71 discharges within the housing 1, the air so discharged can escape only through small cracks at the junction of the panels, with the result that the interior of the housing 1 is maintained under a slight amount of static pressure, and thereby substantially reduces the entrance of dust therein.

It should be understood that changes and modifications in the form, construction, arrangement, and combination of the several parts of the photographic printer may be made and substituted for those herein shown and described without departing from the nature and principle of our invention.

We claim:

1. A photographic printer comprising a housing provided with a vacuum frame, a cold-grid light source shiftably mounted in said housing for optional disposition in a first position under said vacuum frame and in a second position off-set from said frame, a point light source mounted in said housing, a reflector mounted in said housing and interposed between the point light source and vacuum frame for reflecting light from said point light source to said vacuum frame when said cold-grid light source is in said second position, filter means operatively mounted in said housing for optional disposition in front of said point light source so that the light therefrom will pass through said filter means before transmission to said vacuum frame, a light integrator for metering the light from said cold-grid light source and point light source in relation to time, said light integrator including means to detect and measure light from said point light source after said light has been acted upon by said filters, and selector switch means for optionally interconnecting either light source with the integrator for automatically shutting off the light source so connected after a predetermined quantity of light has been emitted therefrom.

2. A photographic printer comprising a housing provided with a vacuum frame, a cold-grid light source shiftably mounted in said housing for optional disposition under said vacuum frame, a point light source mounted in said housing, a reflector mounted in said housing and interposed between the point light source and vacuum frame for reflecting light from said point light source to said vacuum frame, filter means operatively mounted in said housing for optional disposition in front of said point light source so that the light therefrom will pass through said filter means before transmission to said vacuum frame, a light integrator for metering the quantity and color temperature of the light from the cold-grid light source and point light source in relation to time, said integrator including at least two photo cells, one adapted to be exposed to the cold-grid light source and the other adapted to be exposed to the point light source, the latter photo cell being positioned between said filter and said reflector whereby to meter the light from said point light source after said light has been acted upon by said filter means, and selector switch means for operatively connecting either photo cell and associated light source and integrator circuit so that the light source so connected will be shut off by the integrator after a predetermined quantity of light has been emitted therefrom.

3. A photographic printer comprising a housing provided with a vacuum frame, a carriage mounted in said housing in downwardly spaced relation to the vacuum frame, a cold-grid light source mounted in said carriage, means for shifting said carriage and cold-grid light source into and out of operative position under said vacuum frame, a point light source mounted in said housing, a reflector mounted in said housing and interposed between the point light source and vacuum frame for reflecting light from said point light source to said vacuum frame when said cold-grid light source is in an inoperative position, and a blower mounted in said housing and having an intake line for drawing air in from the outside of said housing, said blower being adapted to discharge into said housing and thereby maintain the interior of said housing under a small amount of pressure.

4. A photographic printer comprising a housing provided with a vacuum frame, a cold-grid light source shiftably mounted in said housing for optional disposition in a first position under said vacuum frame and in a second position offset from said frame a point light source mounted in said housing, a reflector mounted in said housing and interposed between the point light source and vacuum frame for reflecting light from said point light source to said vacuum frame when said cold-grid light source is in said second position, and an integrator including at least one photo cell between said point source and said frame and being operatively connected to said point light source for shutting off said point light source after a predetermined quantity of light has been emitted therefrom, said photo cell being exposed to the light emitted from said point light source so as to monitor the color temperature and intensity of the light and extend or shorten the exposure in accordance with fluctuations of color temperature and intensity of said light source.

5. A photographic printer comprising: a housing; a vacuum printing frame supported from below by said housing; a light table supported from below by said housing; means within said housing for illuminating said light table; a cold-grid light source mounted within said housing below said vacuum frame for lateral movement between a first position illuminating the interior of said vacuum frame and a second, non-illuminating position; a point light source mounted in said housing; a reflector interposed between said point light source and said vacuum frame for reflecting light from said point source into said frame when said cold-grid light source is in said second position.

6. Apparatus as in claim 5 further including a plurality of rotatable filter wheels mounted in front of said point light source; a plurality of filters adapted to be positioned on said filter wheels; remote control means for individually rotating said filter wheels so as to selectively dispose one or more filters in front of said point light source; and an integrator positioned between said filter wheels and said vacuum frame for metering, in relation to time, the light which emerges from said light source after said light has been acted upon by said filters, said integrator being operatively connected to said point light source for automatically shutting off the light source after a predetermined quantity of light has been emitted therefrom.

7. A photographic printer comprising: a housing; a vacuum printing frame supported from below by said housing; a cold-grid light source mounted within said housing below said vacuum frame for lateral movement between a first position illuminating the interior of said vacuum frame and a second, non-illuminating position; a point light source mounted in said housing below said cold-grid light source; a reflector interposed between said point light source below said cold-grid light source and said vacuum frame for reflecting light from said point source into said frame when said cold-grid light source is in said second position; and at least one movable filter member between said point light source and said reflector, said filter member carrying a plurality of filters each of which is disposable in front of said point light source upon movement of said wheel.

References Cited by the Examiner

UNITED STATES PATENTS

| | | | |
|---|---|---|---|
| 1,742,372 | 1/30 | Taylor | 95—76 X |
| 2,346,988 | 4/44 | Noel | 95—73 |
| 2,365,225 | 12/44 | Stiffler | 95—73 |
| 2,474,958 | 7/49 | Richards | 88—24 |
| 2,557,182 | 6/51 | Forgett | 88—24 |
| 2,575,621 | 11/51 | Fousek | 95—73 |
| 2,633,784 | 4/53 | Cofield | 95—73 |
| 2,717,545 | 9/55 | Engeler | 95—73 |
| 2,742,837 | 4/56 | Streiffert | 95—75 |
| 2,826,976 | 3/58 | Gelb | 95—73 |
| 2,878,739 | 3/59 | Rogers | 95—73 |
| 2,971,448 | 2/61 | Baumbach | 95—75 |
| 3,002,425 | 10/61 | Biedermann | 95—73 X |

EVON C. BLUNK, *Primary Examiner.*

JOHN M. HORAN, NORTON ANSHER, *Examiners.*